United States Patent [19]

Nickell

[11] 4,142,823
[45] Mar. 6, 1979

[54] CURRENT POWER PLANT

[75] Inventor: James H. Nickell, Brookfield, Mo.

[73] Assignees: Eugene Nickell, Brookfield; Eldon Glenn Nickell, Kansas City; Earl Jerome Nickell, Brookfield, all of Mo.; part interest to each

[21] Appl. No.: 816,395

[22] Filed: Jul. 18, 1977

[51] Int. Cl.² ............................................. F03D 17/00
[52] U.S. Cl. ................................... 415/2; 60/398; 415/201; 290/54
[58] Field of Search ........................... 415/2-4, 415/8, 118, 201; 290/42, 43, 53, 54; 60/458, 398; 137/236

[56] References Cited

U.S. PATENT DOCUMENTS

| | | | |
|---|---|---|---|
| 1,003,635 | 9/1911 | Melander | 415/4 |
| 1,042,381 | 10/1912 | Baker | 290/54 |
| 1,374,801 | 4/1921 | Antley | 415/4 |
| 1,487,391 | 3/1924 | Kochlin | 290/54 |
| 1,529,824 | 3/1925 | Adelmann | 60/398 |
| 3,426,540 | 2/1969 | Fixel | 290/42 |

Primary Examiner—C. J. Husar

[57] ABSTRACT

A current power plant including a shaft mounted turbine wheel for employment in water current, a housing adjacent said impellar and to which the shaft extends, a ramp positioned on the upstream side of said impellar, a frame on which the turbine wheel is mounted, which frame means is mounted by rollers on a tract such that the impellar and frame may be rolled on the tracks inside the housing, whereafter doors are closed, and water around the turbine wheel may be pumped out to facilitate turbine repair.

4 Claims, 3 Drawing Figures

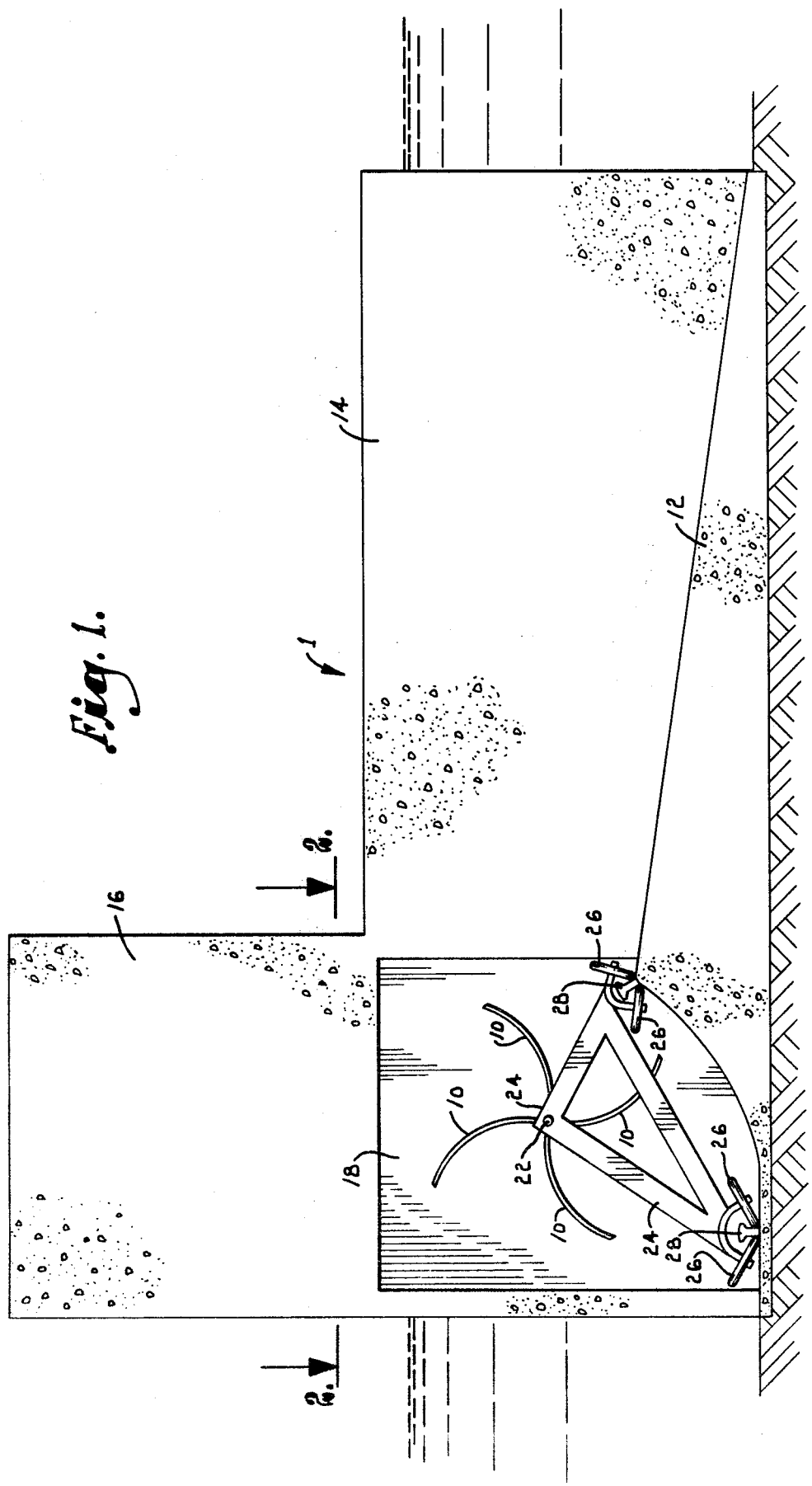

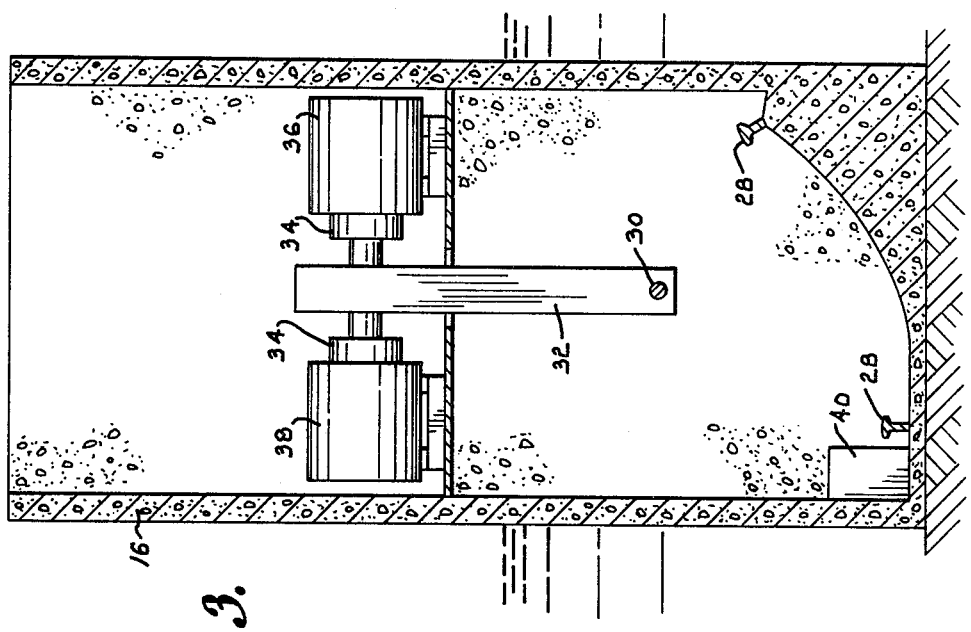
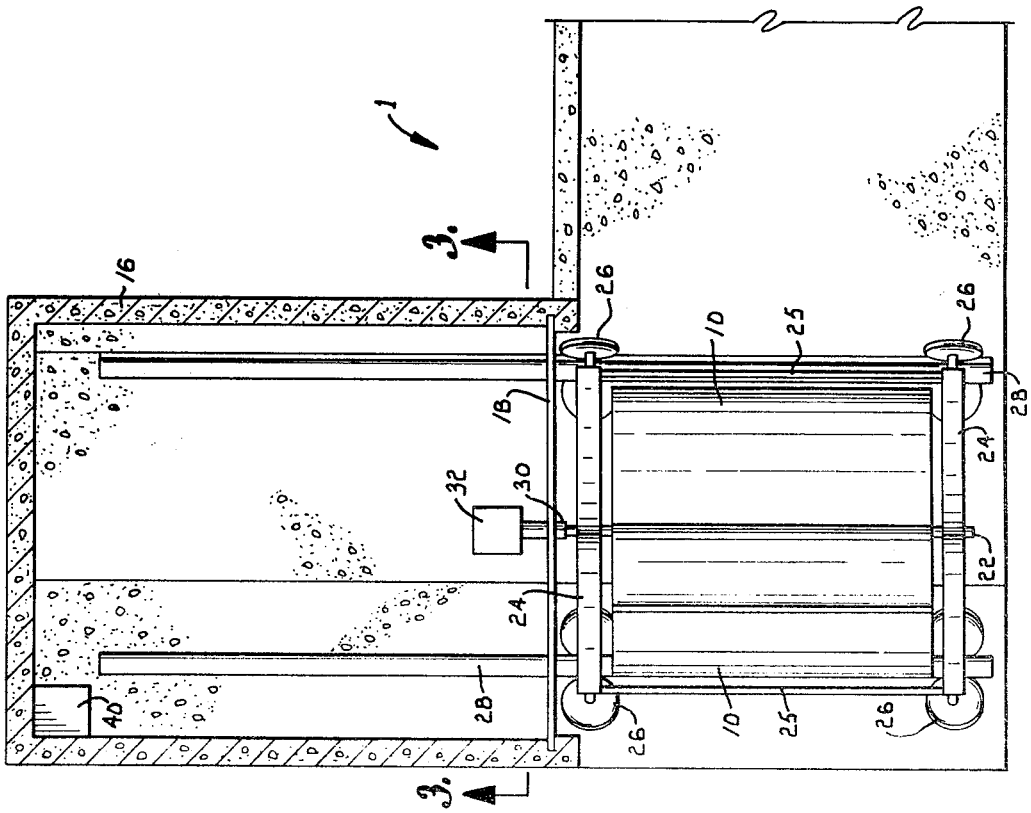

CURRENT POWER PLANT

BACKGROUND OF THE INVENTION

A continuing problem with stream turbines has been the difficulty in maintenance because of the environment of employment.

Of international concern now is the problem of energy production and usage. Since water current may be harnessed for productive use, it has become important as one source of energy for our needs.

Thus, it is an object of this invention to provide a stream or current turbine for the production of power.

A further object of the invention is to provide a stream turbine which may be operated as a floating power plant or mounted in a river bed or in a stream.

DESCRIPTION OF THE FIGURES

FIG. 1 is a side view of the current power plant of the invention.

FIG. 2 is a sectional top plan view of the current power plant of the invention taken along the lines of 2—2 in FIG. 1.

FIG. 3 is a sectional view taken along the lines of 3—3 in FIG. 2.

DETAILED DESCRIPTION

Referring to FIG. 1, there is generally shown a stream power plant 10, having ramp 12, side wall of ramp 14, housing 16, having a door 18, which slides up and down in grooves located inside housing of 16, (as seen in FIG. 2). The turbine has a plurality of blades 10 as seen, however, the specific stream turbine employed could be any of numerous designs adaptable for use in such stream environment e.g., the turbine disclosed in U.S. Pat. No. 3,986,787, issued to William J. Mouton, et. al., could be employed in the instant system. The turbine blades 10, are attached to shaft 22, which is mounted on a triangular shaped frame 24. The frame 24 is mounted on rollers 26, which rest and roll upon tracks 28, with tracks 28 being set or otherwise attached, as shown, to the left end portion of water ramp 12. Ramp 12 may be made of concrete, for example. If the stream turbine is to be permanently mounted in a waterway, as for example, it may be set on the floor or bottom of a river or other environment of water current. Alternatively, the ramp may be made of metal, leaving a hollow interior to provide a floating support for a power plant to be moved in an environment having a water current for operating the turbine. Rails 28, extend laterally across the left end of ramp structure 12 (as seen in FIGS. 1 and 2) and through the doorway of door 18 into the lower portion of housing 16. Shaft 22 of the turbine extends by shaft connection 30 through a hole in door 18, to be connected to a belt, chain, or shaft drive 32 (FIG. 3), which belt, chain or shaft drive conveys power from the turbine shaft 22, and connection 30 to the upper chamber or room in housing 16. In the upper chamber or room of housing 16, the belt, chain or shaft drive 32, is connected via clutches 34, to electric generator 36 and pump 38. The clutches 34, may be of any commercially available variety and the electrical generator may be either d.c. or a.c., and of a size commensurate with the size and length of turbine wheel 20. Of course, other devices to be powered could be employed in the upper chamber of housing 16, to be driven by turbine 20.

Frame 24, has triangular connected pieces of, for example, angle iron as shown in FIG. 1. Additionally, there are frame pieces 25, as shown in FIGS. 1 and 2, which extend lengthwise beneath turbine 2, to connect the roller mounted triangular end frames 24, to each other to provide support.

When it is necessary to service the turbine wheel 20, such as for cleaning or for bearing repair, the service operation may be accomplished as follows:

First, shaft connection 30, and belt, chain or shaft drive 32, are mechanically disconnected and removed from their operational positions. Next, door 18, is raised to an open position by means of an electric motor operated chain drive or hand operated door lifter not shown. Then, turbine wheel 20, and frame assembly 24, is rolled along tracks 28, via wheels 26, through door 18, into lower chamber of housing 16. The turbine 20, and frame 24, may be manually rolled on tracks 28, into the lower chamber of 16, if permitted by the size of the turbine. Otherwise, mechanical means such as a wench or hydraulic cylinders, not shown, may be employed to move turbine 20, and associated carriage 24 and 26, on 28. Once turbine 20 is inside 16, then door 18 is again closed, and the lower chamber of 16 is pumped free of water by sump pump, 40. The hole in door 18, for shaft 30, may be plugged or a closure therefor, may be affixed in place during the servicing operation after shaft connection 30, has been removed from the opening in door 18, preparatory to the movement of turbine 20, inside housing 16.

Housing 16, ramp 12, and the turbine assembly may, as above noted, be mounted and firmly attached to a foundation in and on the bed of the stream where the system is to be employed. The system may alternatively be a floating power plant if, for example, the stream bed locus would provide unacceptable amounts of silt and debris, thus inhibiting operation of the turbine. If employed in a floating mode, then the system would be moored within a stream by ropes, cables, etc., or as shown by the Mouton, et al., patent above noted.

Wheels 26 and track 28 are constructed such that the wheels cannot be lifted off the tracks since the flanges of the tracks 28 and the compatibly shaped wheel mounts 27 for wheels 26 are designed to prevent direct upward removal from the tracks. As seen in FIG. 1, the wheels 26 set at such angle with respect to the flange of the tracks that each wheel has a portion thereof below the flange thus precluding the turbine from being swept away from an operational position by the current.

Turbine 20 is, of course, rotatably mounted on frame 24 by means of suitable bearings not shown. Further, the lower edge of door 18 may be shaped to compliment tracks 28, and the shape of the back of ranp 12 near turbine 24 such that when door 18 is in a closed position, with a minimum of packing around the interface of tracks 28, back of ramp 12 and door 18, water may be kept from entering the housing 16. Housing 16 is shown without a roof or covering but, of course, could be provided with such all within the scope of this invention. Further, tracks 28 may be provided with stops, now shown, at either end to preclude wheels 26 from going beyond said stops.

Having described my invention what I claim is:
1. A water current power plant comprising:
    (a) frame means;
    (b) turbine means rotatably mounted on said frame means to be turned by said current;

(c) said frame means being mounted upon track mounted wheel means;
(d) track means upon which said wheel means rest and on which said wheel means may roll disposed transverse to current flow;
(e) housing means positioned over a portion of said track means;
(f) means for supplying motive force mechanically coupled to said turbine means to be driven thereby;
(g) said housing means further including a door which may be closed after said frame, turbine and wheel means are inside said housing;
(h) said track means further having a flange on its upper extremity;
(i) said track mounted wheel means further including wheels mounted at an angle such that the lower side of said wheels extends beneath and within the span of said flange on either side thereof;
(j) ramp means positioned in proximity to said turbine means for channeling current toward said turbine means;
(k) sump pump means for removing water from said housing means after said door is closed.

2. The power plant of claim 1 wherein said means for supplying motive force is a pump.

3. The power plant of claim 1 wherein said means for supplying motive force is an electrical generator.

4. The power plant of claim 1 wherein said turbine means is mechanically coupled to said means for supplying motive force by a belt, chain or shaft drive means.